US010866069B1

(12) United States Patent
Lumpkin et al.

(10) Patent No.: US 10,866,069 B1
(45) Date of Patent: Dec. 15, 2020

(54) DEVICE FOR NONLETHALLY INCAPACITATING A HUMAN TARGET

(71) Applicant: COUNTER ASSAULT SECURITY SERVICES, LLC, Houston, TX (US)

(72) Inventors: Luke Bryan Lumpkin, Houston, TX (US); Dileep Prasanna Rao, Houston, TX (US)

(73) Assignee: COUNTER ASSAULT SECURITY SERVICES, LLC, Houston, TX (US)

( * ) Notice: Subject to any disclaimer, the term of this patent is extended or adjusted under 35 U.S.C. 154(b) by 0 days.

(21) Appl. No.: 16/564,420

(22) Filed: Sep. 9, 2019

Related U.S. Application Data

(60) Provisional application No. 62/728,707, filed on Sep. 7, 2018.

(51) Int. Cl.
| | | |
|---|---|---|
| *F41H 13/00* | (2006.01) | |
| *H04B 1/08* | (2006.01) | |
| *H04B 1/034* | (2006.01) | |

(52) U.S. Cl.
CPC ..... *F41H 13/0006* (2013.01); *F41H 13/0031* (2013.01); *H04B 1/0346* (2013.01); *H04B 1/086* (2013.01)

(58) Field of Classification Search
CPC .............. F41H 13/006; F41H 13/0012; F41H 13/0018; F41H 13/0025; F41H 13/0031; H04B 1/086; H04B 1/0346
See application file for complete search history.

(56) References Cited

U.S. PATENT DOCUMENTS

| | | | | |
|---|---|---|---|---|
| 4,253,132 | A * | 2/1981 | Cover | F41H 13/0006 361/232 |
| 5,898,125 | A * | 4/1999 | Mangolds | F41H 13/0006 102/293 |
| 2006/0187610 | A1* | 8/2006 | Su | F41B 11/62 361/232 |
| 2009/0266226 | A1* | 10/2009 | Beach | F41H 5/007 89/36.02 |
| 2016/0091284 | A1* | 3/2016 | Hensler | F41H 13/0031 102/430 |

FOREIGN PATENT DOCUMENTS

DE               19952437 A1 *    5/2001          F41H 13/0018

\* cited by examiner

*Primary Examiner* — Stephen Johnson
(74) *Attorney, Agent, or Firm* — Rao DeBoer Osterrieder, PLLC; Dileep P. Rao

(57) ABSTRACT

A device for nonlethally incapacitating a human target. The device can propel a net with one or more conductive loops toward a target. The device can then wirelessly electrically energize the conductive loop or loops to further incapacitate the target. In this manner a human target can be safely captured and controlled.

17 Claims, 8 Drawing Sheets

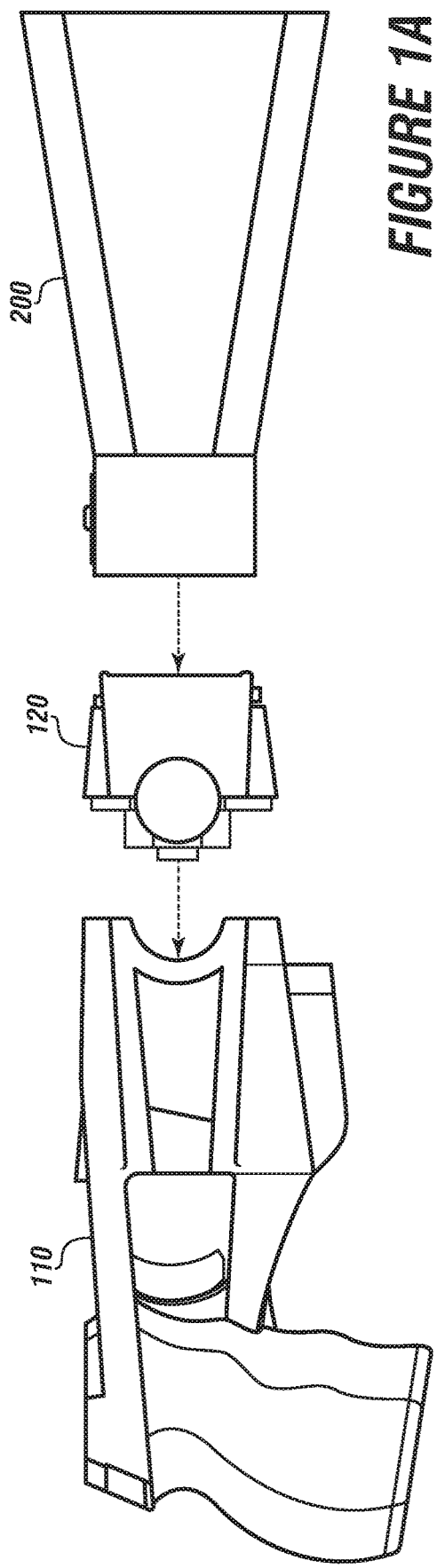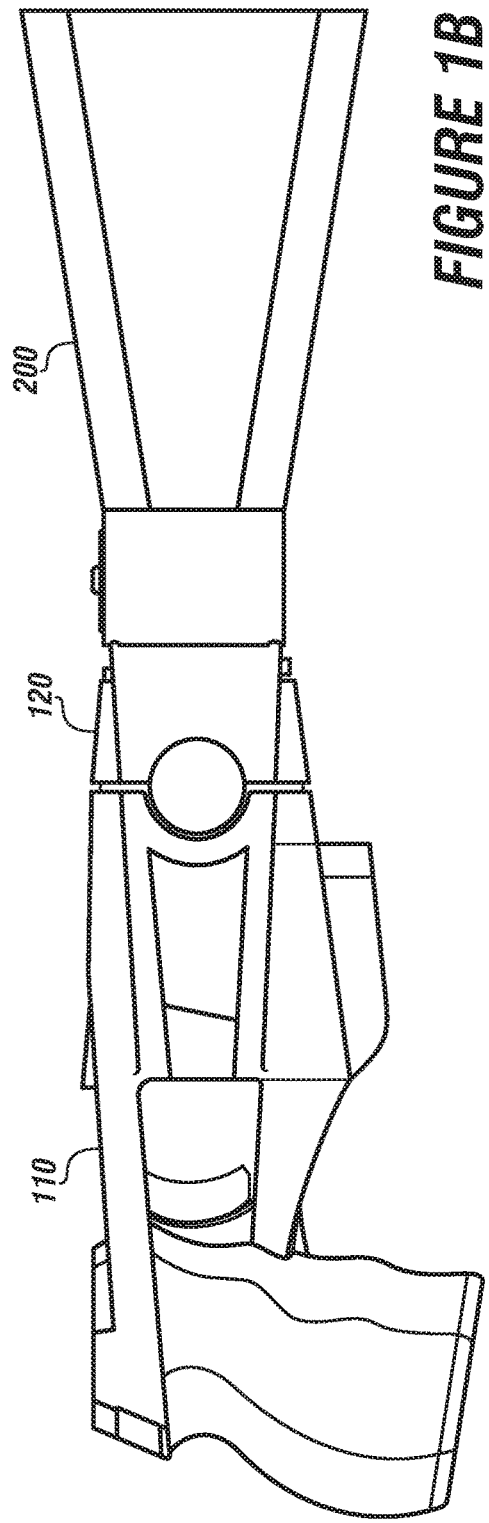

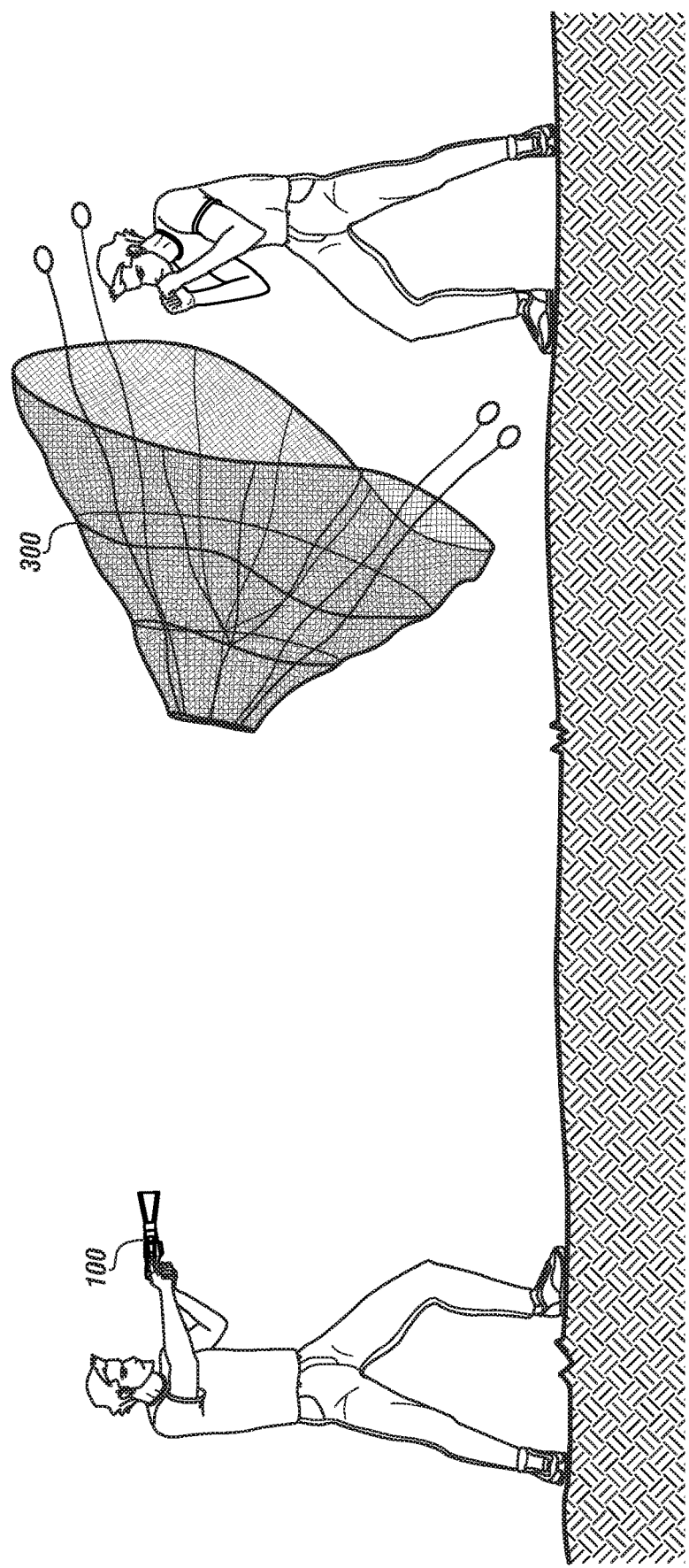

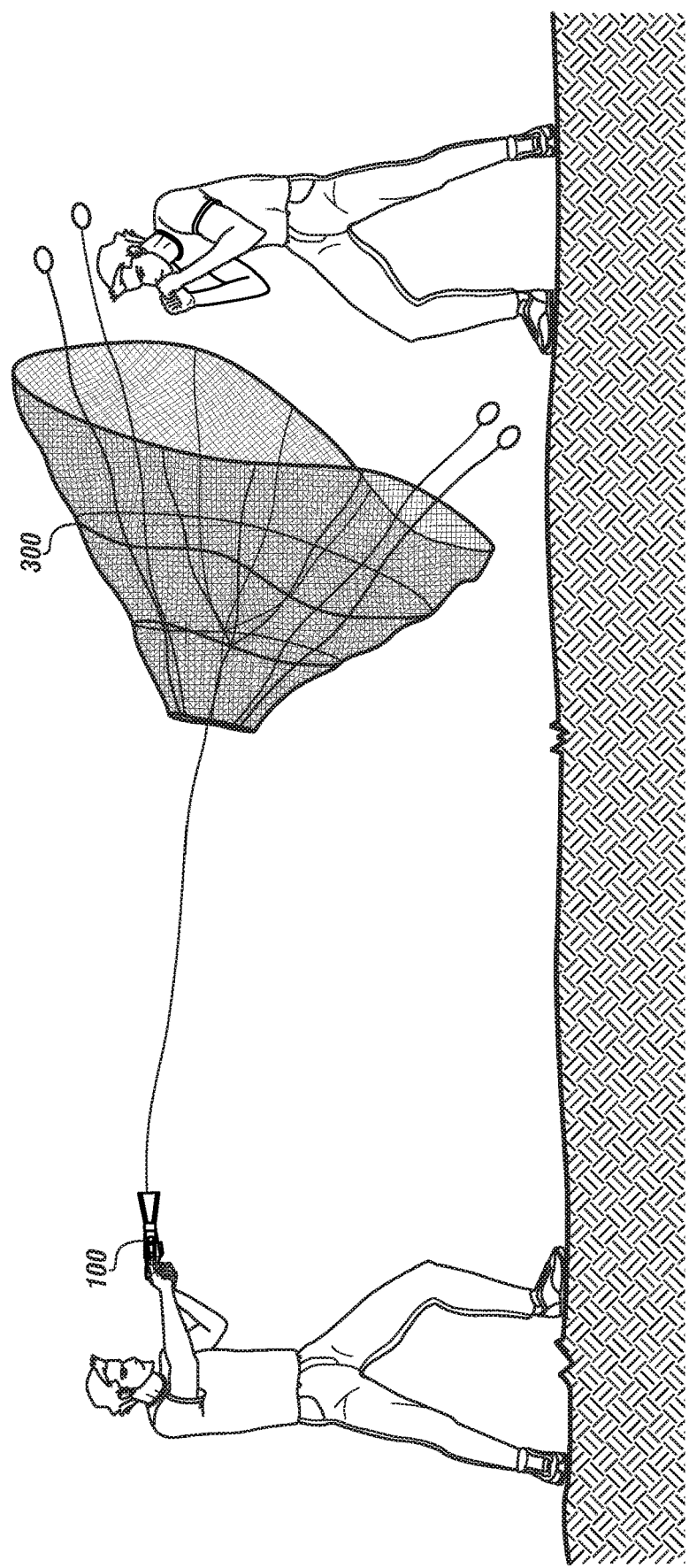

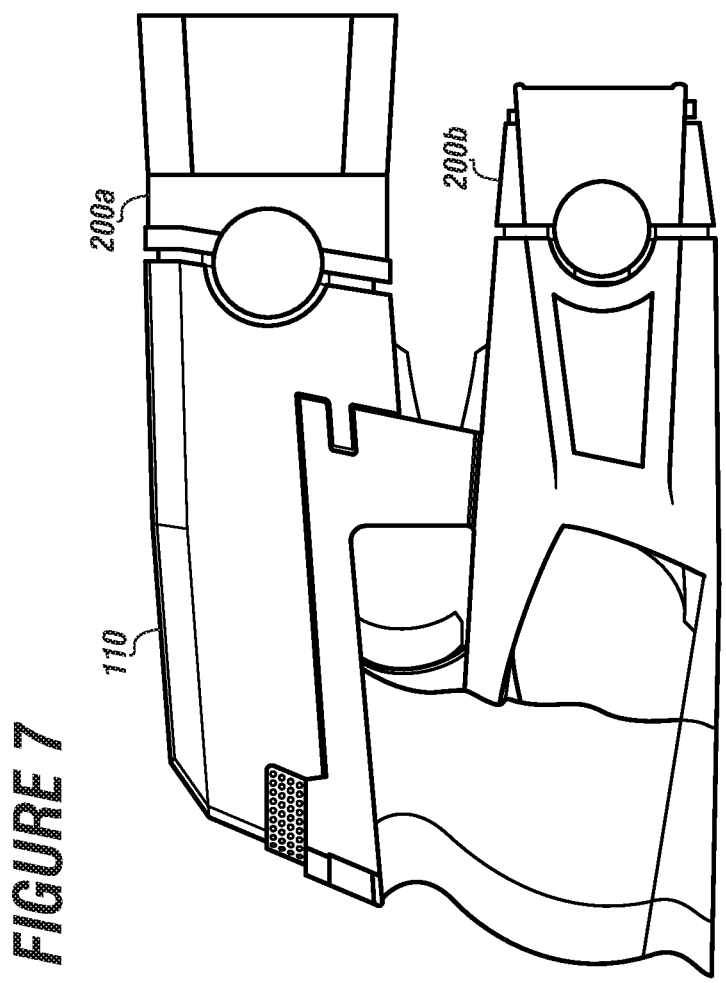

DEVICE FOR NONLETHALLY INCAPACITATING A HUMAN TARGET

CROSS REFERENCE TO RELATED APPLICATIONS

The present application claims priority to and the benefit of U.S. Provisional Patent Application Ser. No. 62/728,707 filed on Sep. 7, 2018, titled "DEVICE FOR NONLETHALLY INCAPACITATING A HUMAN TARGET". This reference is incorporated herein in its entirety.

FIELD

The present disclosure generally relates to a device for nonlethally incapacitating a human target.

BACKGROUND

Entities (such as law enforcement agencies) will sometimes have a need for weapons to fulfil their functions. Persons involved in crowd or animal control will often need to immobilize, or otherwise restrain a subject.

To minimize, or even prevent, the need to use a firearm, an effective restraining device would be exceptionally useful. Currently used solutions, such as stun guns or the commonly used TASER® weapon have limited application ranges and are required to remain in physical contact with the target.

The present state of the art limits efficacy to twenty-one feet at a maximum, with a physical contact with the target that must be maintained for effectiveness.

The present disclosure cures the above deficiencies with an effective range yet to be determined, but significantly greater than twenty-one feet.

BRIEF DESCRIPTION OF THE DRAWINGS

The detailed description will be better understood in conjunction with the accompanying drawings as follows:

FIG. 1A shows a base, an adapter, and a cartridge according to an embodiment of the present disclosure.

FIG. 1B shows a base, an adapter, and a cartridge according to an embodiment of the present disclosure.

FIG. 4A depicts an embodiment of the device of the present disclosure as deployed.

FIG. 4B depicts an embodiment of the device of the present disclosure as deployed.

FIG. 7 depicts an embodiment of a base of the present disclosure.

Figure 2A:
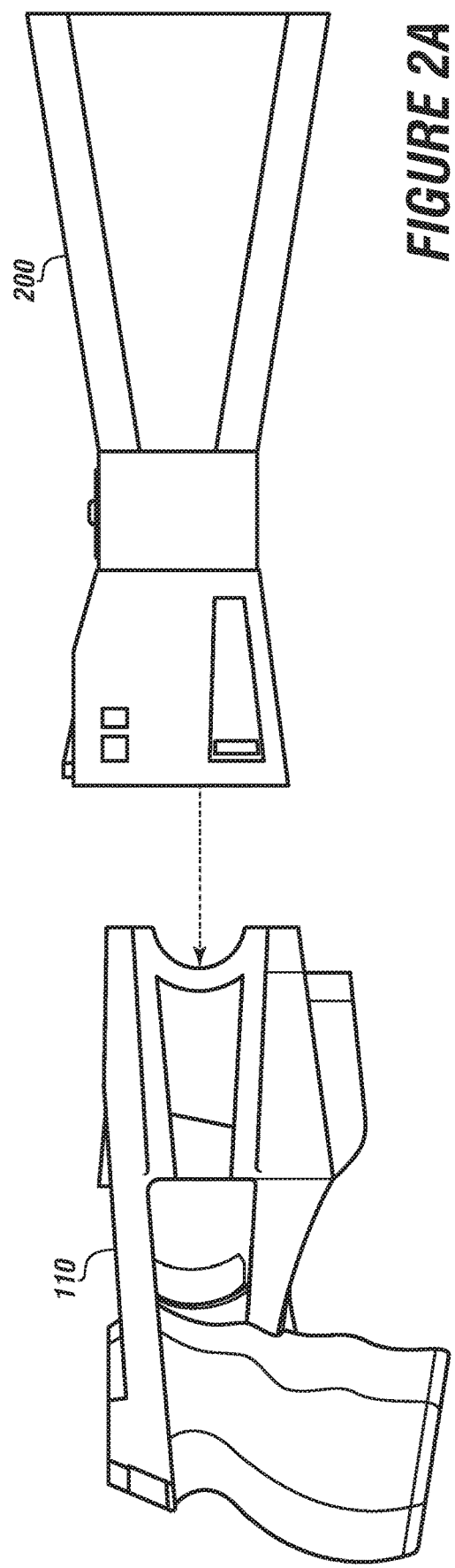
FIG. 2A depicts a base and a cartridge according to an embodiment of the present disclosure as mounted to a handheld firing mechanism.

The embodiments of the present disclosure are detailed below with reference to the listed Figures.

DETAILED DESCRIPTION OF THE EMBODIMENTS

Before explaining the present invention in detail, it is to be understood that the invention is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present invention. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about" means plus or minus 5 percent of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like. Method steps are not limited to any specific order unless explicitly stated.

Accordingly, the scope of protection is not limited by the description herein, but is only limited by the claims which follow, encompassing all equivalents of the subject matter of the claims. Each and every claim is incorporated into the specification as an embodiment of the present disclosure. Thus, the claims are a further description and are an addition to the preferred embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The present embodiments generally relate to a device for nonlethally incapacitating a human target.

The device allows for a physical restraint which, at minimum, can slow a target. Additionally, the device allows for an electrical shock to be delivered to the target for the purpose of incapacitating the target. In this manner, an effective and less dangerous weapon than a firearm can be utilized by agencies such as police, security, animal control, and the like.

The device can have a base with a receptacle which can receive a cartridge.

In embodiments, the base can be mounted to a structure, such as a doorway, ceiling or wall, vehicle, drone, and the like. In other embodiments, the base can refer to a handheld firing mechanism. Alternatively, the base can be attached to a handheld firing mechanism, such as the TASER® gun commonly used by law enforcement. In other embodiments, the base can refer to an adapter for use with an existing handheld firing mechanism.

The base can have an adapter end to fit a handheld firing mechanism. The base can also house a propelling mechanism to propel a net toward a target. The propelling mechanism can be any commonly used method to launch a projectile, such as utilizing a compressed gas, a pyrotechnic, a mechanical launching feature, and the like. In alternate embodiments, the propelling mechanism can be housed within the cartridge. The present disclosure prefers the use of a pyrotechnic as the launch mechanism due to the weight and size of the net being fired. However, it is conceivable that persons having ordinary skill in the art can make use of compressed fluids to launch or propel the net.

The base can also have a radio transmitter for communicating with the net. In embodiments, the base has a radio receiver or an electronic port for receiving electronic instructions, such as to propel the net, and executing the instructions using a computer processor. The radio transmitter can be located in other convenient locations as determined by persons having ordinary skill in the art. For example, the radio transmitter may be located on a holster used to house a handheld firing mechanism.

In other embodiments, the base can receive a mechanical or electrical communication from a handheld firing mechanism. Exemplary methods include an electrical charge created by completing an electrical circuit as desired, or a mechanical firing pin actuated by a trigger such as those commonly used in firearms. In embodiments, the handheld firing mechanism can act as the base.

The base can have a receptacle for securing a cartridge. The cartridge can be integrated with the base and loadable with a net, or a replaceable component containing a net for connection with the base. In embodiments, the cartridge can be flared, or wider, at one end where the net is designed to exit.

The device can have a net contained within the cartridge or loaded into a cartridge area integrated with the base. The net can have a conductive loop, a radio receiver, and/or a power source.

In embodiments, the cartridge can have an insert or an integrated section for housing the net. The section for housing the net can have slots or voids for housing the strands of the net. In embodiments, the net can be constructed utilizing connectors which are attachable to the section for housing the net.

The section for housing the net can also arrange and maintain the net such that concentric loops stay in their orientation with respect to one another, such that the net does not tangle when transported or fired.

In embodiments, the net can be configured to envelop and/or entangle an adult human. The net can have a conductive loop capable of being electrically energized. The net can also have multiple conductive loops, which are either independent or in electronic communication with each other.

In embodiments, the net is at least six feet in effective diameter. A rectangular net is preferably at least six feet in width by six feet in length. Diameter for the purposes of non-circular shapes refers to the longest diagonal able to be drawn from one side of the shape to the other.

The net can be weighted at or proximate the outer edge to help spread the net out when propelled, as well as to aid in entangling a target when contacted. The net can also comprise a power source and a radio receiver. In embodiments, the radio receiver and/or power source can be located within one or more weights distributed at or proximate the outer edge.

The net can receive electronic communication from the base which are executed via a computer processor. The communications are preferably wireless and transmitted from the base based upon user input. However, a mechanical connection, such as a wire extending from the base or cartridge to the net can also be utilized.

The instructions can include, but are not limited to: electrically energizing one or more conductive loops or electrically de-energizing one or more loops. The user can determine any applicable parameters for the energization of the loop(s). For example, in embodiments, the user can selectively choose which loops to energize or how much power to energize the loops with.

In exemplary embodiments, the device can be used to safely capture and control a human target.

The device can be made to fire the net at a human target. The net, being weighted on the outer edges will expand to its full length and width during flight. The angle of the flared elements on the cartridge can be adjusted by persons having ordinary skill in the art to control when, or at what distance, the net is fully expanded.

Upon striking a human target, the net will wrap around and entangle the target. The target will be at least slightly restricted in movement by the physical contact with the net.

The user of the device can actuate a control on the device, for example a button located on the base or a holster or the cartridge, to energize one or more conductive loops on or attached to the net, thereby delivering an electrical shock to the target. This further allows for the human target to be safely captured and controlled without the need for lethal force.

Turning now to the Figures, FIG. 1A shows a base, an adapter, and a cartridge according to an embodiment of the present disclosure.

Shown here are a handheld firing mechanism which acts as a base 110, an adapter piece 120, and a cartridge 200 for housing a net.

FIG. 1B shows a base, an adapter, and a cartridge according to an embodiment of the present disclosure.

Shown here are a handheld firing mechanism which acts as a base 110, an adapter piece 120, and a cartridge 200 for housing a net assembled together. In this embodiment, the base 110 can be an existing handheld firing mechanism, such as a TASER™ gun.

FIG. 2A depicts a base and a cartridge according to an embodiment of the present disclosure as mounted to a handheld firing mechanism.

Shown here are a handheld firing mechanism which acts as a base 110 and a cartridge 200 for housing a net.

Figure 2B:
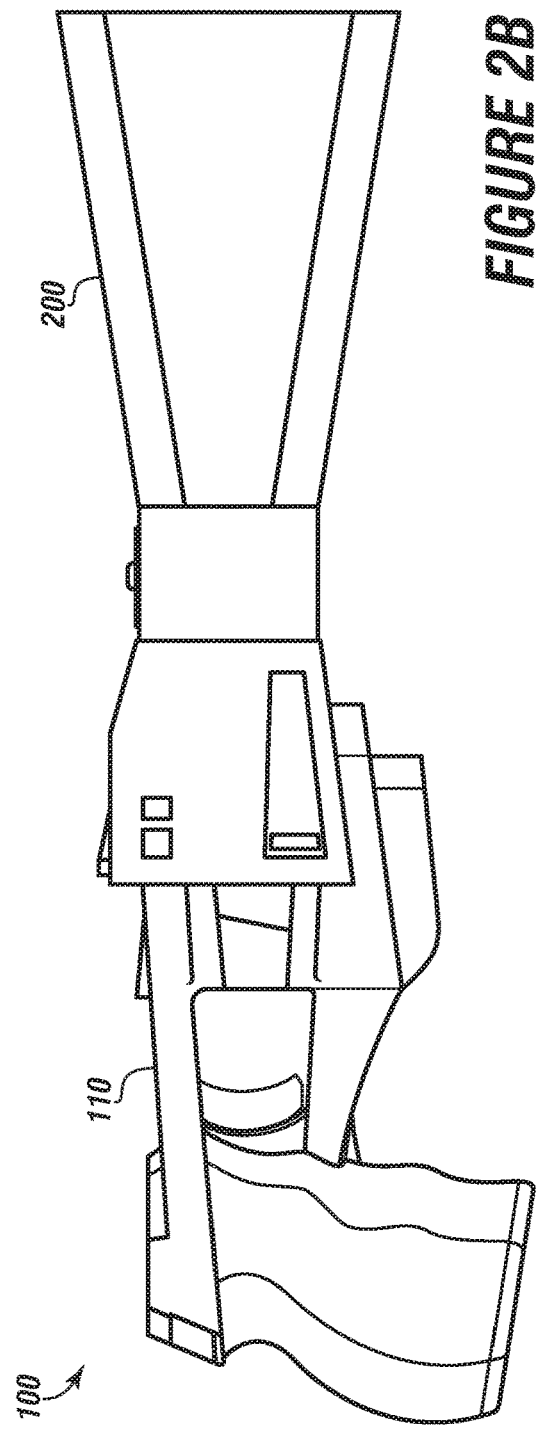
FIG. 2B depicts a base and a cartridge according to an embodiment of the present disclosure as mounted to a handheld firing mechanism.

FIG. 2B depicts a base and a cartridge according to an embodiment of the present disclosure as mounted to a handheld firing mechanism.

Shown here are a handheld firing mechanism which acts as a base 110, and a cartridge 200 for housing a net assembled together.

Figure 3A:
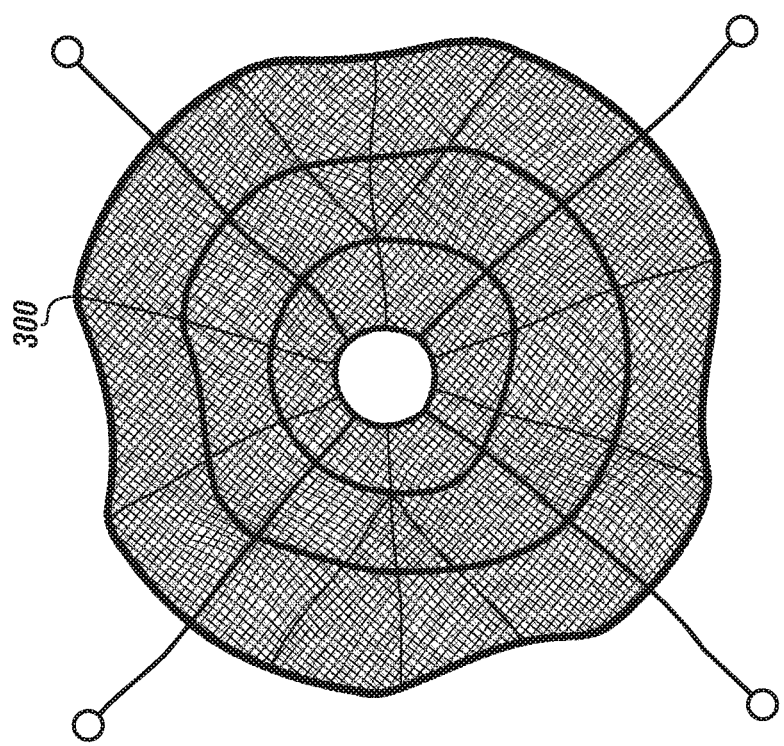
FIG. 3A depicts a net according to an embodiment of the present disclosure.

FIG. 3A depicts a net according to an embodiment of the present disclosure.

Shown here is net 300.

Figure 3B:
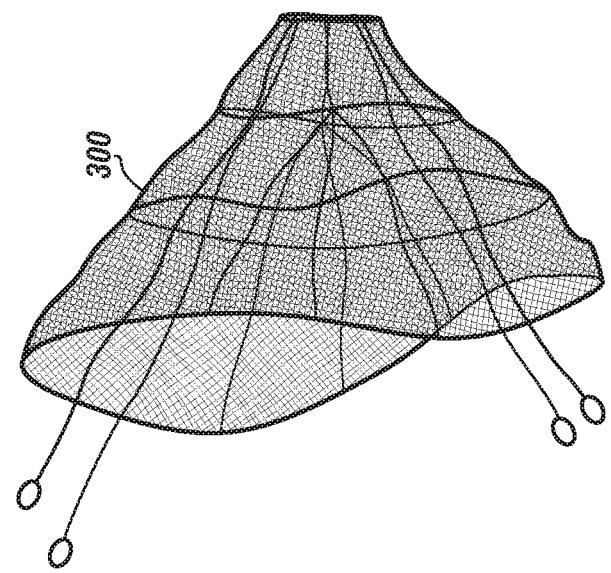
FIG. 3B depicts a net according to an embodiment of the present disclosure.

FIG. 3B depicts a net according to an embodiment of the present disclosure.

Shown here is side view of net 300.

FIG. 4A depicts an embodiment of the device of the present disclosure as deployed.

Shown here is an embodiment of the device 100 of the present disclosure launching a net 300 at a human target.

FIG. 4B depicts an embodiment of the device of the present disclosure as deployed.

Shown here is an embodiment of the device 100 of the present disclosure launching a net 300 at a human target. In this embodiment the device 100 has a mechanical connection with the net 300. In embodiments, the mechanical connection can comprise a probe for contacting the skin of the human target.

Figure 5:
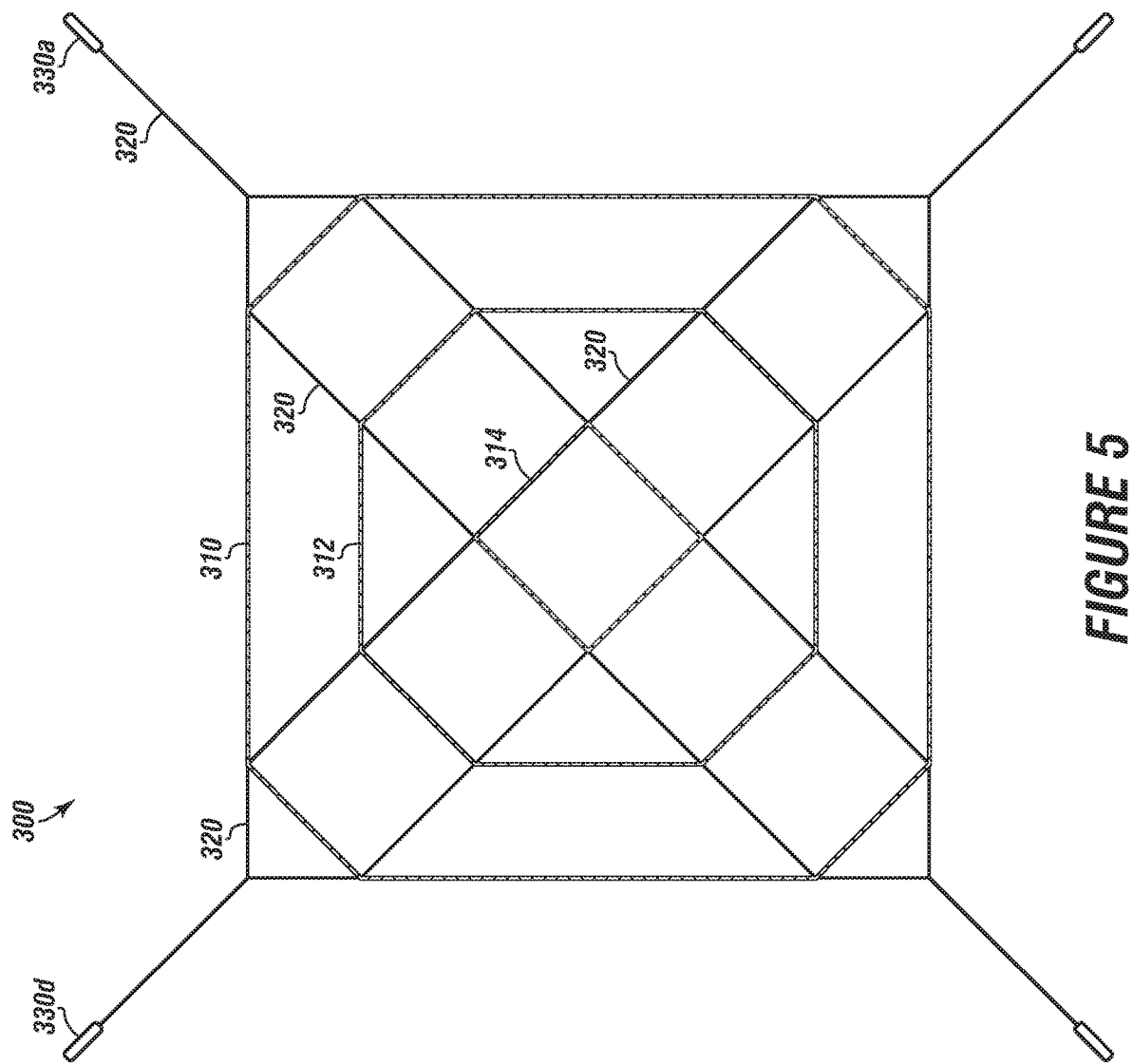
FIG. 5 depicts an embodiment of a net of the present disclosure.

FIG. 5 depicts an embodiment of a net of the present disclosure.

Shown here is an embodiment of net 300 with conductive loops 310, 312, and 314. Conductive loops 310, 312, and 314 can also be attached to, and positioned by non-conductive element 320. In this embodiment, conductive loops 310 and 314 can have the same polarity, but opposite that of conductive loop 312. In this manner, two zones of shock are made available to use on a human target.

The net 300 can be weighted on the corners, or otherwise proximate the perimeter with tractors 330a-330d. The tractors 330a-330d can serve a dual purpose in aiding the net to expand and fly as desired and aimed, as well as housing other components of the net, such as a power source, radio transmitter, radio receiver, lights, electronics, and the like.

In embodiments, the tractors 330a-330d can also house redundant power supplies or other elements. Insulated wires can connect tractors 330a-330d to conductive loops 310, 312, and 314.

Figure 6:
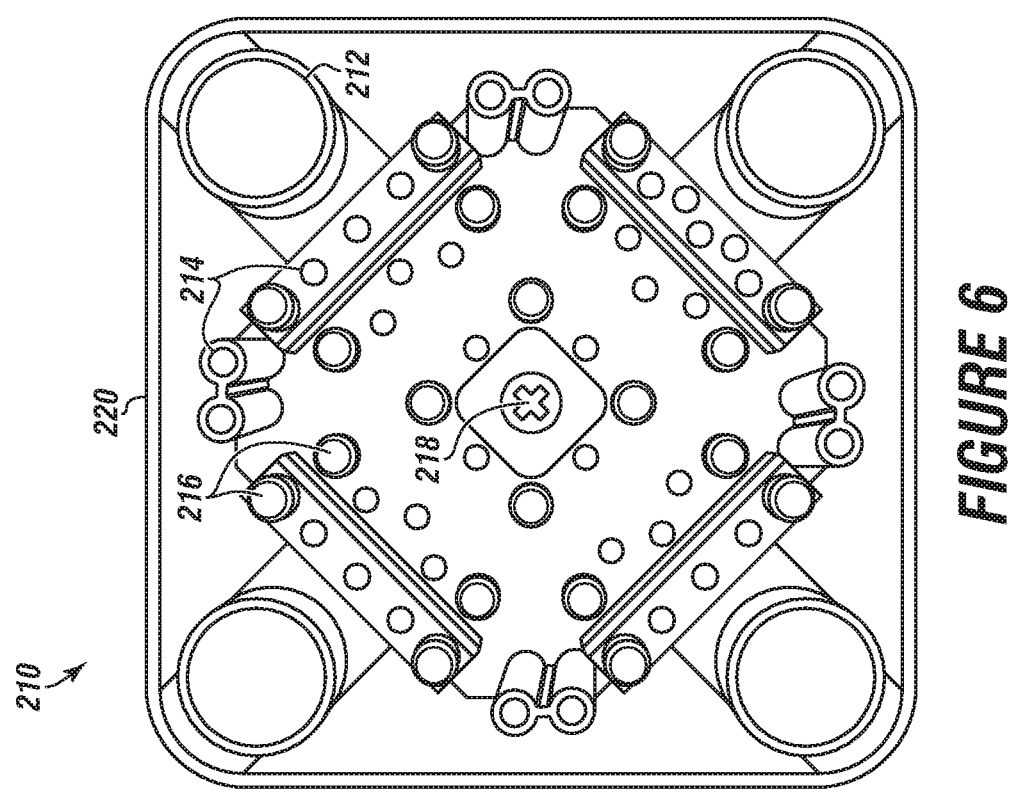
FIG. 6 depicts an embodiment of an insert for loading a net of the present disclosure.

FIG. 6 depicts an embodiment of an insert for loading a net of the present disclosure.

Shown here is insert 210 with various structures for housing a net of the present disclosure. Insert 210 can have large slots or voids 212 for housing the tractors. In addition, the insert 210 can have slots or voids 214 for housing conductive or non-conductive elements of the net. The insert 210 can further have raised elements 216 for attaching to net connectors and maintaining loops of the net in desired orientation. As can be seen, insert 210 can be organized in the same way as the net in a concentric manner to prevent sections of the net from tangling during transport or launch.

Inset 210 can have an enclosure 220 and an attachment point 218 to secure it to the base.

FIG. 7 depicts an embodiment of a base of the present disclosure.

In this embodiment, the based 110 can be attached to cartridge 200a housing a net, as well as cartridge 200b housing a probe with a mechanical communication to the base 110. In this manner, the user can determine whether to shoot a wired or wireless shocking device.

While the present disclosure emphasizes the embodiments, it should be understood that within the scope of the appended claims, the disclosure might be embodied other than as specifically described herein.

What is claimed is:

1. A device for nonlethally incapacitating a target comprising:
    a. a base comprising a receptacle for securing a cartridge; and
    b. the cartridge housing a net, wherein the net comprises:
        (i) a conductive loop; and
        (ii) a power source; and
    wherein the base comprises a radio transmitter and the net comprises a radio receiver, and further wherein the net is propelled toward the target.

2. The device of claim 1, wherein a user causes a signal to be selectively transmitted to the net to electrically energize the conductive loop.

3. The device of claim 1, wherein the base comprises a mechanical communication to the net.

4. The device of claim 1, wherein the net is configured to envelop an adult human.

5. The device of claim 1, wherein the net has multiple conductive loops.

6. The device of claim 1, wherein the net comprises a weight at an outer edge.

7. The device of claim 6, wherein the power source and/or the radio receiver are within the weight.

8. The device of claim 6, wherein the net comprises a plurality of weights.

9. The device of claim 8, wherein the power source and/or the radio receiver are within the weights.

10. The device of claim 1, wherein the net is propelled toward the target with a pyrotechnic charge.

11. The device of claim 1, wherein the base receives communication from a user.

12. The device of claim 1, wherein the base transmits a signal to the net wirelessly via the radio transmitter.

13. A device for nonlethally incapacitating a target comprising:
    a. a radio transmitter; and
    b. a net, wherein the net comprises:
        (i) a conductive loop;
        (ii) a radio receiver; and
        (iii) a power source; and
    wherein the net is propelled toward the target and is capable of electrically energizing the conductive loop.

14. The device of claim 13, wherein the net comprises a first conductive loop and a second conductive loop.

15. The device of claim 14, wherein the first conductive loop is in electronic communication with a first power supply and the second conductive loop is in electronic communication with a second power supply.

16. The device of claim 15, wherein the first conductive loop and the second conductive loop can be independently energized.

17. A device for nonlethally incapacitating a target comprising:
    a. a radio transmitter;
    b. a net, wherein the net comprises:
        (i) a conductive loop; and
        (ii) a radio receiver;
    c. a power source capable of electrically energizing the conductive loop; and
    d. a probe for contacting the skin of the target.

* * * * *